3,099,650
PROCESS FOR PREPARING LIQUID POLYMERS AND COPOLYMERS WITH REDUCED MODIFIER LEVELS
Thomas W. Boyer, Richard O. Stucker, and Edward L. Ries, Louisville, Ky., assignors to American Synthetic Rubber Corporation, Louisville, Ky., a corporation of Delaware
Filed Oct. 19, 1961, Ser. No. 146,191
9 Claims. (Cl. 260—139)

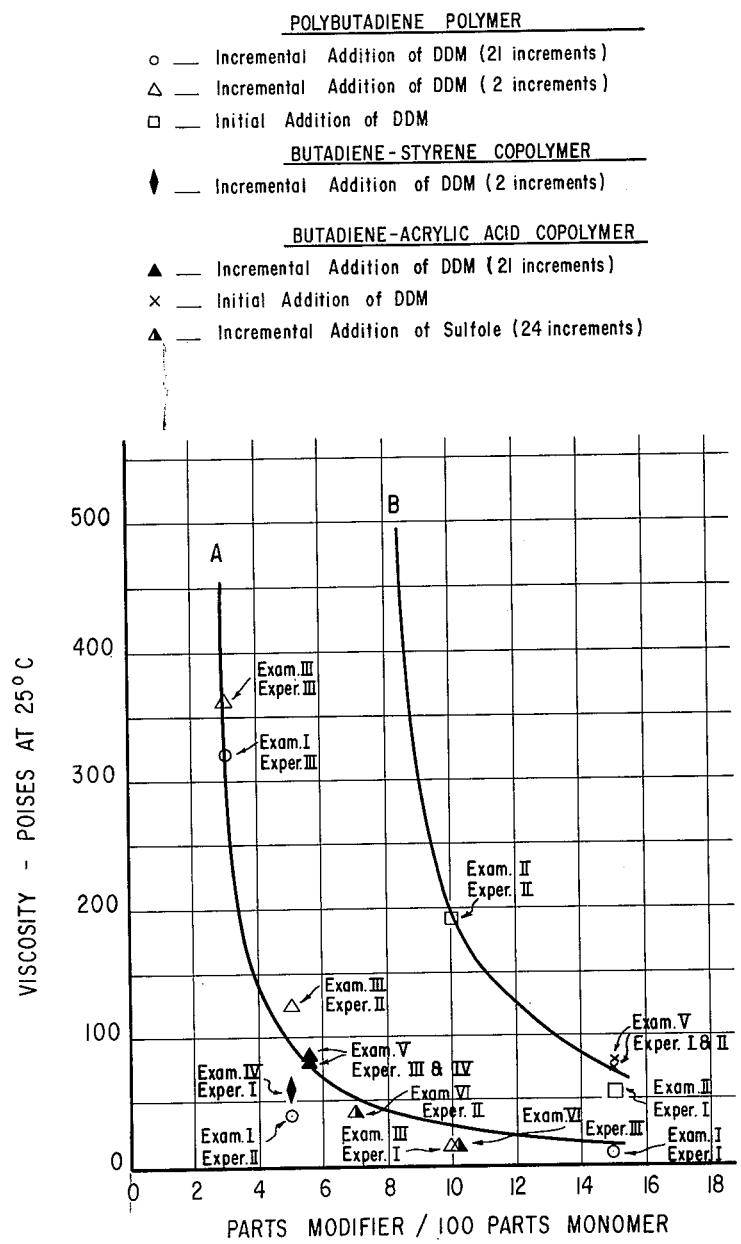
FINAL VISCOSITY vs. MODIFIER LEVELS
FOR INCREMENTAL AND INITIAL ADDITIONS
INVENTORS
THOMAS W. BOYER
RICHARD O. STUCKER
EDWARD L. RIES

United States Patent Office 3,099,650
Patented July 30, 1963

This invention relates to the emulsion polymerization of butadiene and butadiene and its comonomers to a liquid polymer. More particularly, the present invention relates to the emulsion polymerization of butadiene and butadiene and its co-monomers to a liquid polymer by the process of incremental addition of modifier whereby a reduction in the modifier requirements is effected.

It is known in the art that in making solid rubbers the modifier can be added incrementally if so desired, as indicated by U.S. Patent 2,434,536. However, to the best of our knowledge there is no recognition in the art that the incremental addition of modifier in the production of liquid rubber will result in appreciable economies in modifier requirements. As for the reason for the savings in modifier, no explanation can be given since the underlying chemical mechanism is not known; and the substantial savings in modifier requirements which were effected were entirely unexpected.

It is, therefore, an object of this invention to provide a novel process for the manufacture of liquid rubbers.

A further object of this invention is to provide a more economical process for the manufacture of liquid rubbers.

A further object of this invention is to provide a process for the manufacture of liquid rubbers in which a substantial saving in modifier requirements is effected.

A further object of this invention is to provide a novel process for the manufacture of liquid rubbers in which the modifier is incrementally added rather than initially added.

These and other objects of this invention will be apparent from the description hereinafter.

The novel process of this invention comprises making an unsaturated organic composition of matter having a liquid consistency by forming an aqueous emulsion of butadiene or butadiene and an unsaturated co-monomer, in the presence of a polymerization catalyst, thereafter subjecting the emulsion to conditions effecting polymerization, adding an aliphatic mercaptan incrementally throughout the polymerization cycle, and recovering the polymerization product from the resulting reaction mixture. The mercaptan is usually added in the amount ranging from 2 to 15 parts/100 parts of butadiene or butadiene and co-monomer, to produce a liquid polymer. For the purpose of this application a liquid rubber polymer is one which has a viscosity of 15,000 poises or less at 250° C. Preferably the liquid rubber polymer will have a viscosity of 10,000 poises or less at 250° C.

Other objects and advantages of the foregoing invention will become apparent from the following detailed description taken in conjunction with the accompanying drawing which consists of a graph setting forth the final viscosities obtained for given amounts of modifier when added initially and when added incrementally.

According to the present invention, the emulsion is conducted in accordance with conventional emulsion polymerization practice in the manufacture of butadiene and butadiene-co-monomer synthetic rubber. Thus, after the desired degree of polymerization has been obtained, the reaction mixture can be treated to remove any unconverted reactants. These can be removed in any known way, for example, by vacuum distillation. The polymeric reaction product is then broken out of the emulsion by addition of a coagulating agent, such as sulfuric acid, whereupon the polymeric material rises to the surface and forms a supernatant oil layer. This oily layer is then separated from the water layer and can be dissolved in any suitable volatile organic solvent as part of the separation process.

However, the feature which characterizes the present invention is the incremental addition of the mercaptan in two or more increments throughout the polymerization cycle in contrast to the addition of all of the mercaptan initially, whereby in each instance a liquid polymer with equivalent viscosity properties is formed. On the other hand, where the addition is incremental, substantially less mercaptan is required.

By way of example, a recipe frequently used in making a liquid butadiene synthetic rubber is the following:

| Component: | Parts/100 parts monomer |
|---|---|
| Butadiene | 100 |
| Soap | 4.3 |
| Water | 180 |
| Catalyst (potassium persulfate) | 0.2 |
| Modifier (dodecyl mercaptan) | 10–25 |

The polymerization of such a formulation can be conducted at 50° C. for a period of time of 14 hours which results in a polymerization up to about 72% of butadiene, approximately 28% remaining unreacted.

It has been found that at least a 50% reduction in the amount of mercaptan can be effected to produce a liquid polymer of equal viscosity by adding the mercaptan in two or more increments or continuously throughout the polymerization cycle. It will be found desirable to withhold a portion of the total butadiene (amount in recipe) charged as monomers to use as a diluent for the mercaptan to facilitate a more accurate addition of the mercaptan since the total amount of mercaptan employed is relatively small and somewhat difficult to measure.

In addition, various modifications can be made in the process of this invention. For example, the relative proportions of butadiene, including co-monomers used in conjunction therewith can vary widely between limits similar to those which apply in the manufacture of butadiene-co-monomer synthetic rubber.

Moreover, the temperature at which the polymerization is conducted in accordance with the present invention is likewise variable within the limits commonly employed in making butadiene and butadiene co-monomer synthetic rubber, i.e. from 5 to 60° C. and usually about 50° C.

Furthermore, the time of reaction can vary from 4 to 28 hours, depending upon the other conditions and the extent of polymerization desired. A reaction time of 16 hours is often preferred for liquid rubber.

It is to be further noted that the co-monomer used in conjunction with the butadiene can be any suitable polymerizable unsaturated organic compound heretofore copolymerized with butadiene.

Among the unsaturated organic compounds which are capable of copolymerizing with the butadiene in an aqueous emulsion are: aryl olefins and substituted aryl olefins (e.g., styrene, p-chlorostyrene, p-methoxystyrene, alpha methyl styrene, vinyl naphthalene, and the like); alkyl esters of acrylic acids (e.g., methyl acrylate, methyl methacrylate, butyl acrylate, and the like); nitriles of acrylic and methacrylic acids (e.g., acrylonitrile, methacrylonitrile, and the like); vinylidine chloride; vinyl ketones (e.g., methyl vinyl ketones); vinyl ethers; vinyl carbazole, vinyl furan; vinyl pyridine; and the like.

Any of the mercaptans which have been used in the emulsion polymerization of butadiene and a co-monomer, such as styrene, to make a liquid polymer or synthetic rubber such as GR–S, which is also known as Buna S and SBR, can be employed. In general, normal, secondary and tertiary mercaptans containing at least six carbon atoms and their mixtures can be added incrementally throughout the polymerization to produce liquid rubber. By way of example, n-dodecyl mercaptan (DDM) and tertiary dodecyl mercaptan (Sulfole) are particularly well suited for the novel process of this invention.

The amount of water used in preparing the emulsion is ordinarily the same as that used in the emulsion polymerization of butadiene and butadiene and co-monomer to make a solid synthetic rubber of this type.

Any of the well-known initiators or catalysts, either singly or in combination, used in emulsion polymerization of butadiene and a co-monomer, can be employed. Examples are the organic acid peroxides and hydroperoxides such as para-menthane hydroperoxide, acetyl propionyl peroxide, acetyl butyryl peroxide, and benzoyl peroxide. In addition such inorganic catalysts as hydrogen peroxide, alkali metal or ammonium perborates or persulfates, and the like, can be employed. The proportions of catalyst can be the same as in making butadiene co-monomer synthetic rubber. Usually the catalyst will be present in amounts less than 1% of the total emulsion.

Summarizing the foregoing, the mode of operation of the novel process of this invention can be illustrated with a reaction system comprising butadiene as the monomer. The reactants are emulsified with an aqueous solution containing suitable emulsifying agents and polymerization catalysts such as persulfates, peroxides and the like. A portion of the butadiene is withheld as a solvent for the mercaptan. The mercaptan-butadiene solution is added to the reaction in two or more increments. One increment is usually added initially, and it is desirable but not necessary to add the increments at equal intervals throughout the polymerization cycle. The emulsion is continuously agitated during the reaction period while maintaining the temperature at about 50° C.

At the conclusion of the reaction period any unconverted reactants are recovered by vacuum or by conventional steam stripping (in the case where higher boiling co-monomers are used) and the product broken out of the emulsion by the addition of a suitable coagulating agent. The supernatant oil layer is mechanically separated and dissolved in solvents such as benzene for further purification treatment. Oxidation inhibitors such as phenyl-beta-naphthylamine, are ordinarily added at this point and the product is dehydrated in a distillation operation by the azeotropic action of the solvent or by vacuum flash methods. Although the mode of operation has been described in terms of the emulsion polymerization of the monomer butadiene, it is evident that the process is equally applicable to butadiene and unsaturated co-monomer which have heretofore been co-polymerized with butadiene.

As illustrative of the present invention, the following specific examples are set forth. However, it is to be understood that they are not intended to limit the invention thereto. In each of the examples the parts are per 100 parts monomer.

Example I

Liquid polymers were prepared in three experiments involving variable proportions of mercaptan. The exact proportions of the butadiene and the mercaptan are given in the subjoined tabulation along with the other pertinent data. In each experiment the butadiene was emulsified in 180 parts of water and 4.3 parts of sodium flakes and 0.2 part of potassium persulfate. The emulsion systems were agitated at 50° C. until 60% conversion of the monomers were reached. The mercaptan and 20 parts of butadiene withheld from the initial charge were charged in 21 equal increments at uniform intervals during the polymerization starting with 1 increment initially. In processing the reaction product the emulsions were broken with dilute sulfuric acid to yield supernatant oil layers which were separated and dissolved in an equal portion of benzene. Phenyl-beta-naphthylamine amounting to 1.25 parts per 100 parts rubber was added at this point prior to removal of water and solvent by distillation. Viscosities were determined at 80° F. by a Brookfield viscometer.

| Experiment | I | II | III |
|---|---|---|---|
| Butadiene charge to reactor, parts | 80 | 80 | 80 |
| Butadiene charge to mercaptan increment, parts | 20 | 20 | 20 |
| Dodecyl mercaptan, parts | 15 | 5 | 3 |
| Reaction temperature, ° C | 50 | 50 | 50 |
| Product viscosity, poises at 25° C | 10 | 38 | 320 |

Example II

Liquid polymers were prepared in three experiments involving variable proportions of mercaptan as in Example I but the mercaptan was added to the initial reaction products. The withheld butadiene was added in two equal increments, one at 20% conversion and the other at 40% conversion.

| Experiment | I | II | III |
|---|---|---|---|
| Butadiene charge to reactor, parts | 80 | 80 | 80 |
| Butadiene charge to increment, parts | 20 | 20 | 20 |
| Dodecyl mercaptan, parts | 15 | 10 | 5 |
| Reaction time, hours | 11.3 | 12.8 | 13.3 |
| Reaction temperature, ° C | 50 | 50 | 50 |
| Product viscosity, poises at 25° C | 56 | 196 | 10,000 |

Example III

Liquid polymers were prepared in three experiments involving variable proportions of mercaptan as in Example I and variable number of increments added at uniform intervals throughout the polymerization cycle.

| Experiment | I | II | III |
|---|---|---|---|
| Butadiene charge to reactor, parts | 80 | 80 | 80 |
| Butadiene charge to mercaptan increment, parts | 20 | 20 | 20 |
| Dodecyl mercaptan, parts | 10 | 5 | 3 |
| Number of equal butadiene-mercaptan increments [1] | 2 | 2 | 2 |
| Reaction time, hours | 12 | 13 | 15.5 |
| Reaction temperature, ° C | 50 | 50 | 50 |
| Product viscosity, poises at 25° C | 10 | 125 | 360 |

[1] First increment added initially.

Example IV

As in Example III above, a liquid polymer was prepared in experiments I and III by using 2 and 21 increments, respectively, and in experiment II by initial addition, but the monomers consisted of 70 parts of butadiene and 30 parts of styrene.

| Experiment | I | II | III |
|---|---|---|---|
| Butadiene charge to reactor, parts | 50 | 70 | 50 |
| Styrene charge to reactor, parts | 30 | 30 | 30 |
| Butadiene charge to mercaptan increments parts | 20 | 0 | 20 |
| Dodecyl mercaptan, parts | 5 | 5 | 2.5 |
| Number of equal butadiene-mercaptan increments [1] | 2 | 0 | 21 |
| Reaction time, hours | 10 | 10.5 | 14 |
| Reaction temperature, ° C | 50 | 50 | 50 |
| Product viscosity, poises at 25°C | 55 | 3,240 | 8,000 |

[1] First increment added initially.

Example V

Liquid polymers were prepared in four experiments involving variable proportions and initial and incremental addition of mercaptans. The polymerization recipe was as follows:

| Component: | Parts/100 parts monomers |
|---|---|
| Butadient | 91 |
| Acrylic acid | 9 |
| Cetyl dimethyl benzyl ammonium chloride | 4.3 |
| Water | 180 |
| Azobisisobutyronitrile (AIBN) | 0.35 |
| Dodecyl mercaptan | Variable |

In each experiment the butadiene charged to the reactor was emulsified in the 180 parts of water containing the 4.3 parts of soap, 9 parts acrylic acid and 0.35 part of AIBN. The mercaptan was added to the initial charge for two experiments and added incrementally as in Example I by withholding a portion of butadiene for two other experiments. The emulsion system was agitated at 50° C. until 60% conversion of the monomers were reached. In processing the reaction product the emulsions were broken by adding concentrated sodium chloride sufficient to make 4% sodium chloride concentration in the total water present. The supernatant oil layer was separated mechanically and dissolved in benzene and scrubbed with water to remove the residual acrylic acid. Phenyl-beta-naphthylamine and tertiary butyl catechol were added prior to the removal of the benzene solvent by distillation.

| Experiment | I | II | III | IV |
|---|---|---|---|---|
| Butadiene charge to reactor, parts | 91 | 91 | 71 | 71 |
| Acrylic acid | 9 | 9 | 9 | 9 |
| Butadiene charge to mercaptan increments, parts | 0 | 0 | 20 | 20 |
| Dodecyl mercaptan, parts | 15 | 15 | 5.5 | 5.5 |
| Number of equal butadiene-mercaptan increments [1] | | | 21 | 21 |
| Product viscosity, poises at 25°C | 83 | 74 | 78 | 84 |

[1] First increment added initially.

*Example VI*

Liquid polymers were prepared in three experiments involving variable properties of mercaptan added incrementally as in Example V but the mercaptan used was tertiary dodecyl mercaptan.

| Experiment | I | II | III |
|---|---|---|---|
| Tertiary dodecyl mercaptan, parts | 5 | 7 | 10 |
| Number of equal butadiene-mercaptan increments | 24 | 24 | 24 |
| Product viscosity, poises at 25° C | 310 | 40 | 10 |

From the foregoing description and examples, it will be evident that there has been devised an emulsion polymerization process for producing liquid rubber polymers whereby substantial savings in modifier requirements are effected. For example, only 5.5 parts of modifier or mercaptan per 100 parts of monomer are required if added incrementally (or continuously) in contrast to 15 parts of modifier per 100 parts of monomer being required if added initially to produce a polymer having substantially the same viscosity as evidenced by experiments IV and I, respectively, of Example V above, and as graphically set forth in the drawing. By referring to the drawing it will be readily apparent that the left curve, indicated as A, which is plotted from examples and experiments wherein the modifier is added incrementally, consistently uses less modifier per monomer to attain a given viscosity than the right curve, indicated as B, which is plotted from examples and experiments wherein all of the modifier was added initially. In this connection compare experiments III and IV of Example V (incremental) with experiments I and II of Example V (initial). Thus the modifier requirements for the incremental or continuous addition process are substantially reduced in excess of 50% over the conventional process of adding all of the ingredients including the modifier initially to obtain in each instance a liquid polymer of substantially the same viscosity.

While the illustrative embodiments of the invention have been described hereinbefore with particularity, it will be understood that various other modifications will be apparent to and can readily be made by those skilled in the art without departing from the scope and spirit of the invention. Accordingly it is not intended that the scope of the claims appended hereto be limited to the examples and description set forth herein but rather that the claims be construed as encompassing all the features of patentable novelty which reside in the present invention including all features which would be treated as equivalents thereof by those skilled in the art to which the invention pertains.

What is claimed is:

1. In an emulsion polymerization process for making liquid rubber polymers whereby the modifier requirements are reduced at least 50% over conventional emulsion polymerization processes for making liquid rubber polymers of substantially the same viscosity, the steps comprising forming an aqueous emulsion of butadiene containing a polymerization catalyst, subjecting the emulsion to conditions effecting polymerization and adding a modifier incrementally throughout the polymerization to produce liquid rubber.

2. In an emulsion polymerization process for making liquid rubber polymers whereby the modifier requirements are reduced at least 50% over conventional emulsion polymerization processes for making liquid rubber polymers of substantially the same viscosity, the steps comprising forming an aqueous emulsion of butadiene and an unsaturated organic monomer capable of copolymerizing with said butadiene and containing a polymerization catalyst, subjecting the emulsion to conditions effecting polymerization and adding a modifier incrementally throughout the polymerization to produce liquid rubber.

3. The process of claim 2 in which the monomer is styrene.

4. The process of claim 1 wherein the modifier is selected from the group consisting of primary, secondary and tertiary mercaptans.

5. The process of claim 2 wherein the modifier is selected from the group consisting of primary, secondary and tertiary mercaptans.

6. The process of claim 1 in which the ratio of total modifier to total butadiene ranges from 2–15 parts to 100 parts by weight of monomer.

7. A process according to claim 1 wherein the polymerization is effected at a temperature of 5° to 60° C. and at a reaction time of 4 to 28 hours.

8. A process according to claim 2 wherein the polymerization is effected at a temperature of 5 to 60° C. at a reaction time of 4 to 28 hours.

9. In an emulsion polymerization process for making liquid rubber polymers having a viscosity of 15,000 poises and less at 250° C. whereby the modifier requirements are reduced at least 50% over conventional emulsion polymerization processes for making liquid rubber polymers of substantially the same viscosity, the steps comprising forming an aqueous emulsion of butadiene containing a polymerization catalyst, subjecting the emulsion to conditions effecting polymerization and adding a modifier incrementally throughout the polymerization to produce liquid rubber.

References Cited in the file of this patent

UNITED STATES PATENTS 2,434,536     Arundale     Jan. 13, 1948

OTHER REFERENCES

Kolthoff et al.: J. Polymer Sci. 2 (1947), pages 49–71.
Krause: Rubber Age 75 (1954), pages 217–222.